United States Patent
Maastricht

[11] 3,893,355
[45] July 8, 1975

[54] COOLANT SUPPLY SYSTEM FOR CUTTING TOOLS IN A MACHINE TOOL

[75] Inventor: Charles R. Maastricht, Fond du Lac, Wis.

[73] Assignee: Giddings & Lewis, Inc., Fond du Lac, Wis.

[22] Filed: Dec. 21, 1973

[21] Appl. No.: 427,321

[52] U.S. Cl. ............... 82/24; 29/DIG. 92; 90/11 A; 279/1 TS; 279/20; 408/60
[51] Int. Cl. .......................................... B23b 21/00
[58] Field of Search ......... 408/713, 239, 57, 59, 60; 279/1 TS, 20, 103; 90/11 A; 82/24; 29/DIG. 64–69, DIG. 92, 26 A

[56] References Cited
UNITED STATES PATENTS

| | | | |
|---|---|---|---|
| 2,084,022 | 6/1937 | Frank | 29/DIG. 66 X |
| 2,777,702 | 1/1957 | Rodal | 279/20 |
| 3,364,800 | 1/1968 | Benjamin et al. | 408/239 |
| 3,460,410 | 8/1969 | Briles | 408/57 |
| 3,555,962 | 1/1971 | Wolf | 408/56 |
| 3,662,442 | 5/1972 | Noa | 29/26 A |

Primary Examiner—J. M. Meister
Assistant Examiner—Z. R. Bilinsky
Attorney, Agent, or Firm—Wolfe, Hubbard, Leydig, Voit & Osann, Ltd.

[57] ABSTRACT

A cutting tool coolant supply system for a machine tool wherein coolant is supplied to the cutting area through mating internal passages formed in the tool support member, such as the ram of a vertical lathe, and the tool adapter. A sealing ring is provided in the lower end of the tool support member for engaging the radial flange of the tool adapter to facilitate automatic and reliable coupling of the internal passages when the adapter is positioned in the support member for a machining operation.

13 Claims, 4 Drawing Figures

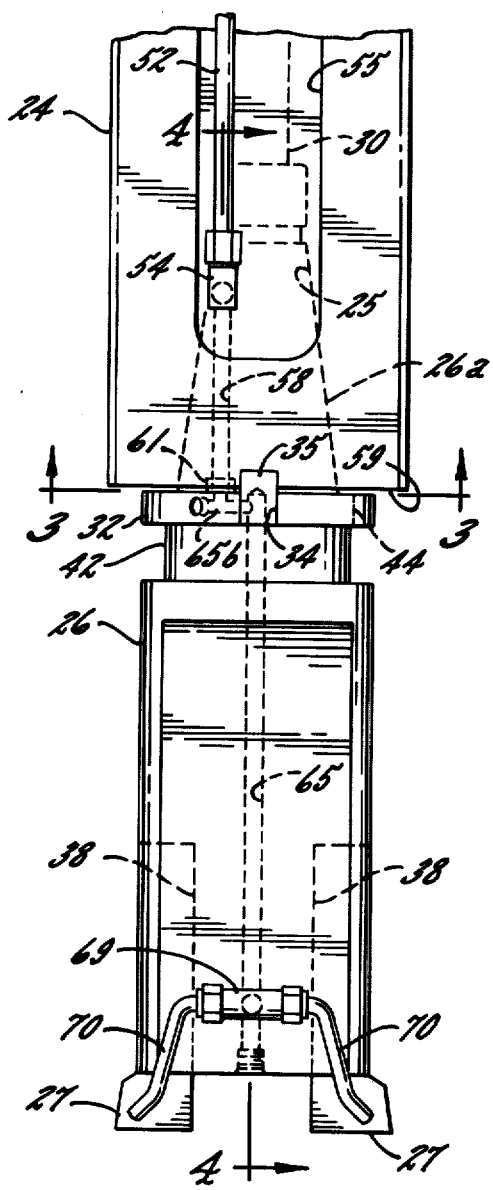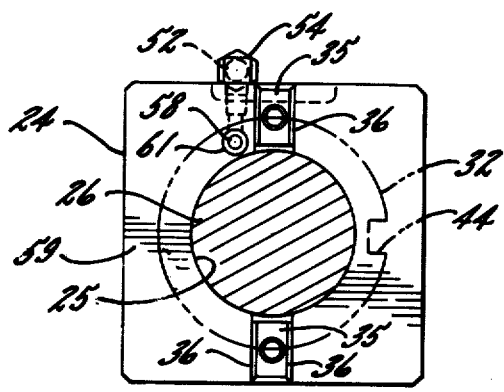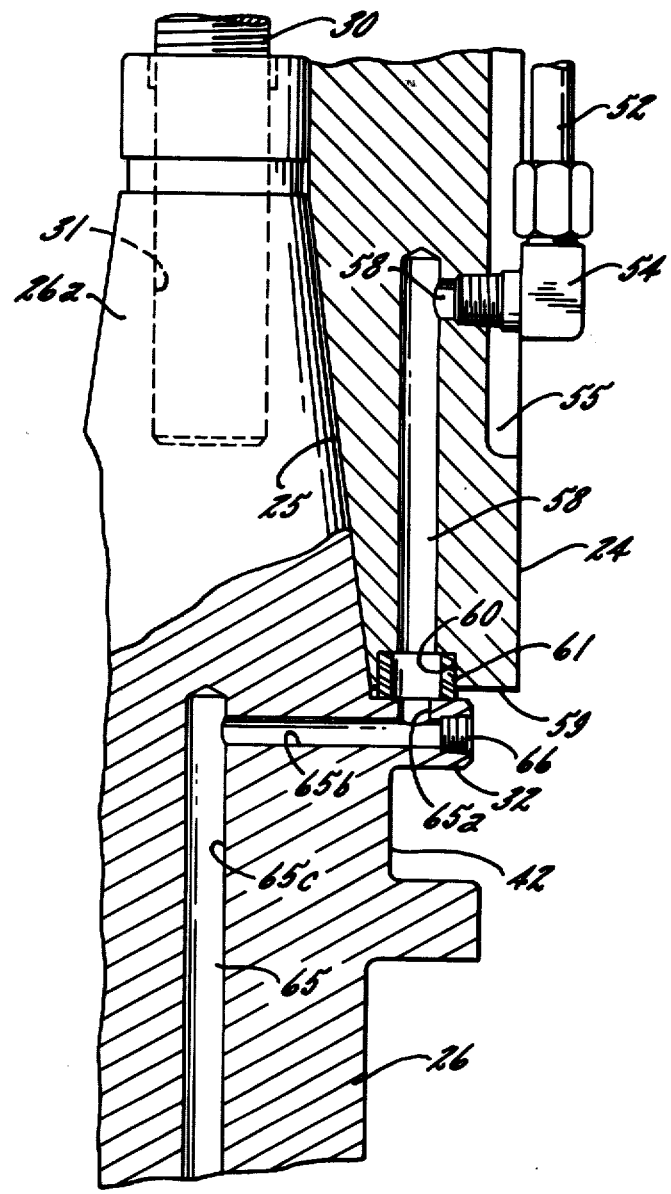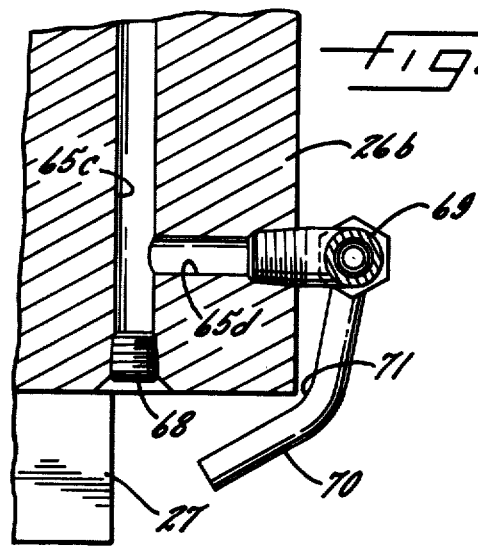

COOLANT SUPPLY SYSTEM FOR CUTTING TOOLS IN A MACHINE TOOL

DESCRIPTION OF THE INVENTION

The present invention relates generally to machine tools, and more particularly to a system for supplying cooling fluids to a cutting tool during machining operations.

In the past, various attempts have been made in supplying coolant to the cutting tool at a work area during machining operations. These prior systems have had various drawbacks for many machines and especially those equipped with automatic tool changers. One such prior cooling system has included a flexible conduit that is attached to the exterior of the ram or other tool support member with one end connected to a coolant supply source and the other end adapted to direct fluid on to the cutting tool at the work area. Such attachment type conduit systems, however, have required frequent adjustment in order to keep the coolant flow directed to the cutting area. This is troublesome for the machine operator since to make the adjustment the operator must stop the machine in order to avoid possible injury from flying chips or moving machine elements.

In another type of prior cutting tool coolant system internal ports are provided in the tool support and tool shank which connect at the interface between their tapered mating surfaces when a cutting tool is placed into position for a machining operation. Coolant fluid is then directed from a reservoir through the internal ports to the cutting area. In such systems, it has been difficult to achieve reliable coupling of the ports at the tapered tool shank and tool support surfaces and coolant often leaks to contaminate or otherwise enhance dirt accumulation between the tapered surfaces, thereby preventing the precision fit necessary for accurate machining operations.

It is an object of the present invention to provide an improved cutting tool coolant system that is particularly adapted for machine tools with automatic tool changing.

Another object is to provide a cutting tool coolant system for machine tools as characterized above in which the coolant supply is automatically and reliably coupled to an internal passageway in the tool when the tool is deposited in its support for a machining operation.

A further object is to provide a cutting tool coolant system of the above kind in which coolant is supplied to the cutting area through mating internal passages formed in the tool and tool support without damaging or contaminating a precision tapered fit therebetween.

Still another object is to provide a novel tool adapter for use in a machine tool with such a cutting tool cooling system.

Other objects and advantages of the invention will become apparent upon reading the following detailed description and upon reference to the drawings, in which:

FIG. 2 is an enlarged plane view of the tool secured within the tool support ram of the machine tool shown in FIG. 1;

FIG. 3 is a transverse section taken in the plane of line 3—3 in FIG. 2; and

FIG. 4 is an enlarged fragmentary section taken in the plane of line 4—4 in FIG. 2.

Figure 1:
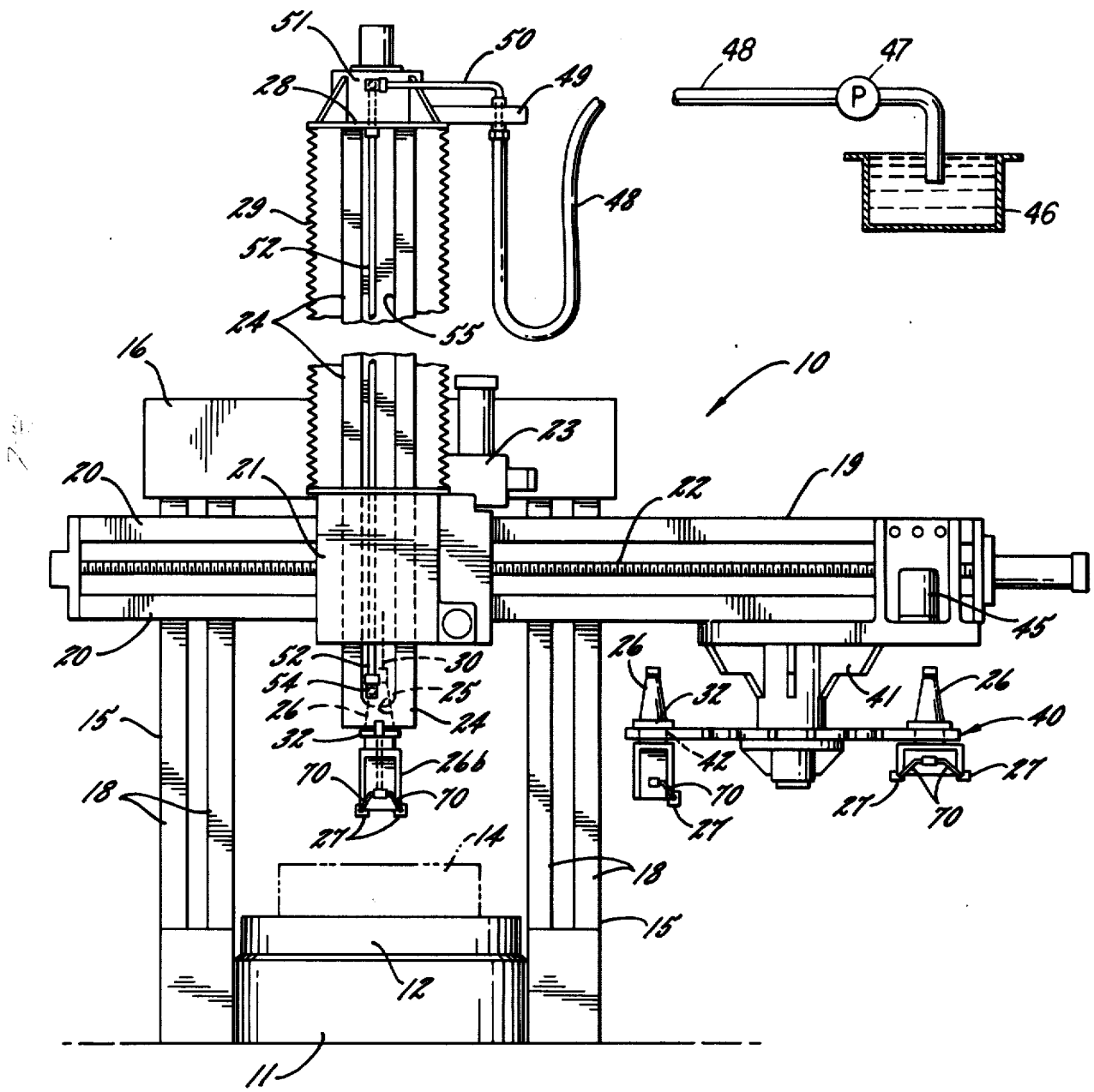
FIG. 1 is a front elevation view of a machine tool with a cutting tool coolant system embodying the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

Referring now to the drawings, the invention is there illustrated in a machine tool 10 having automatic tool-changing capabilities. The machine tool 10 in this case is a vertical lathe that includes a base 11 with a power-driven rotary table 12 capable of rigidly supporting a workpiece 14, shown in phantom. Extending up from opposite sides of the base 11 are columns 15 which are connected at their upper ends by a crosspiece 16 and are formed with vertical guideways 18 for supporting a vertically adjustable cross rail 19. The cross rail 19 has horizontal guideways 20 that slidably support a saddle 21 for movment in a horizontal direction in response to rotation of a power driven lead screw 22. The saddle 21, in turn, slidably supports an elongated tool carrying ram 24 that is vertically movable through operation of a ram drive unit 23. To protect the guide surfaces of the ram 24 from dirt or other foreign matter, the upper portion of the ram is enclosed by a collapsible below 29 that is connected between the saddle 21 and a bracket 28 fixed up to the upper end of the ram. The lower end portion of the ram 24 has a socket 25, in this case having a tapered configuration, for receiving a correspondingly tapered tool adapter or holder 26 which carries a pair of cutting tools 27. A power drawbolt 30 of a conventional type is provided for selectively engaging a central threaded aperture 31 of the tool adapter 24 to secure and retain the tool adapter rigidly in place in the ram.

The tool adapter 26, as best shown in FIGS. 2 and 4, is formed with a radial flange 32 between its upper tapered shank portion 26a and a lower tool head portion 26b. In order to provide a driving connection between the tool holder 26 and the ram 24, diametrically opposed keyways 34 are formed in the flange 32 for receiving drive keys 35 in the lower end of the ram. The illustrated ram keys 35 have beveled sides 36 for guiding a tool adapter 26 into precise final angular relation with respect to the ram while being seated in the ram socket. The tool head 26b in this case is formed with a pair of opposed vertical slots 38 that receive each one of the cutting tools 27. It will be appreciated that two tools preferably are provided in order to accommodate tooling for both boring and turning operations.

For the purpose of storing a plurality of different tools for use in the ram 24, a carrousel type tool storage magazine 40 is supported by a bracket 41 fixed in depending fashion from one end of the cross rail 19. The magazine 40 has a pulurality of suitable tool support sockets which each may have a breakaway shoe such as shown in Johnson et el application Ser. No. 341,971 which is assigned to the same assignee as the present applicant. Such magazine shoes are adapted to straddle and removably support a tool adapter 26 about a circumferential groove 42 formed in the tool adapter below its radial flange 32. The tool adapter flange 32 also preferably is formed with a keyway 44 (FIG. 2)

that is adapted to receive an appropriate key in the tool magazine to orient and maintain the tool adapter in a predetermined angular position. The magazine 40 is mounted for rotational movement about a vertical axis, and a drive motor 45 is provided for rotating the magazine so that a selected tool adapter 26 carried in the magazine may be positioned at a predetermined transfer station. All movements of the machine elements may be numerically controlled from a suitable source of programmed data in a conventional manner.

The ram 24 is shown in a ready position in FIG. 1 with a tool adapter 26 in the tapered socket 25 of the ram 24. A tool change may be effected by traversing the saddle 21 and ram 24 along the cross rail 19 to a position where the tool adapter 26 carried by the ram enters an empty magazine socket located at the transfer station. The drawbolt 30 is then actuated to unlock the tool adapter, and the ram 24 is elevated leaving the tool adapter 26 positioned in the magazine. The magazine can then be indexed to present a new tool adapter 26 to the transfer station, at which time the ram 24 may be lowered to engage the new tool adapter and the power drawbolt 30 actuated to draw in and lock the tool adapter in the ram. The saddle 21 and ram 24 are then traversed away from the magazine in a horizontal direction extracting the tool from the magazine, and by further prescribed movements of the saddle 21, ram 24, and rail 19, the tool may be brought to the workpiece 14.

In accordance with the invention, provision is made for selectively directing coolant fluid through coupled internal passages in the tool support ram and tool adapter to the cutting area during a machining operation without contaminating or otherwise adversely affecting the precision fit between the tool adapter and ram. To this end, cooling fluid is directed from a suitable reservoir 46 by a pump 47 into a flexible line 48 which connects to a flexible hose support member 49 protruding from the bracket 28 at the top of the ram 24. It will be understood that the flexible coolant supply line 28 accommodates movement of the ram 24 relative to the saddle 21 and cross rail 19. A rigid conduit 50 connects the flexible line 48 to a manifold block 51 integral with the bracket 28 anchored at the top of the ram. A coolant supply line 52 is disposed vertically along the front face of the ram 24 between the manifold block 51 and an elbow fitting 54 threadably engaging the lower end of the ram. The line 52 in this case is disposed adjacent a recess area 55 formed in the front surface of the ram 24. As best shown in FIG. 4, the elbow fitting 54 supports the lower end of the line 52 and couples it to an internal drilled passage 58 formed in the ram. The passage 58 makes an immediate right angle turn and then extends longitudinally the remaining length of the ram where it exits from a lower horizontal face 59 at a point laterally offset from the tool socket 25. The outlet of the passage 58 is enlarged by a counterbore 60 within which is fitted an annular flexible sealing ring 61 that projects a short distance below the ram end face.

In keeping with the invention, each tool adapter 26 is formed with an internal passage 65 which may be automatically and reliably coupled to the outlet of ram passage 58 when the tool adapter is positioned in the ram socket 25 and through which coolant may be directed to the cutting tools 27. As shown in FIG. 4, the tool holder 26 is formed with a short vertical passage 65a originating and having an inlet on the top side of the flange 32 which is adapted to be brought into coaxial alignment with the outlet 58 of the ram. The vertical passage 65a extends only partially through the flange 32 until it intersects a radial bore 65b extending from the outer periphery of the flange 32 to the center of the tool adapter 26. The outer end of the bore 65b in this case is closed by a threaded plug 66. The radial bore 65b communicates with a vertical centrally located bore 65c that extends from the radial bore 65b through the lower end of the tool head 26b. The lower end of this central bore 65c also is closed by a threaded plug 68. A radial passage 65d is formed in the tool head 26b near the lower end of the vertical passage 65c to provide an outlet from the tool adapter. A T-shaped pipe fitting 69 in this case is in threaded engagement with the outer end of the radial outlet passage 65d.

For directing coolant from the outlet passage 65d and fitting 69 to the cutting blades 27, a rigid preformed conduit 70 is connected to each end of the T-fitting 69. The conduits 70 in this case are formed with a bend 71 so that their outer ends are positioned in relatively close predetermined relation to the respective cutting tool 27. The outer ends of each conduit also preferably are shaped to provide a desired flow pattern to the cutting area, such as a spray mist or flood type flow.

During a tool change operation when a tool adapter 26 is inserted in the ram socket 25 the beveled ram drive keys 35 will tend to orient the tool adapter to a precise final angular relation with respect to the ram. At the same time, the drawbolt 30 draws the tool adapter rigidly in place in the ram and the end of the sealing ring 61 protruding below the bottom surface of the ram will envelope the inlet of the passage 65a in the tool holder flange 32 to form a fluid tight coupling between the passages 58 and 65. During a machining operation, cooling fluid may then be directed to the cutting tools 27 from a remote fluid reservoir through the flexible line 48, rigid line 50, manifold 51, the vertical line 52, internal passages 58, 65 and the conduits 70. It will be understood that the supply of coolant through such a circuit may be selectively and automatically controlled by known means. For example, the pressure supply for the coolant may be shut off during a tool change operation or whenever there is no tool in the ram socket. Suitable limit switches associated with the power operated drawbolt mechanism may be used to signal the absence or presence of a tool in the ram. Alternatively, a control signal originating from the numerical control system for the machine could be used to control the coolant supply pressure.

In view of the foregoing it can be seen that the coolant supply system of the present invention is adapted to reliably supply coolant to the cutting tools and is particularly adapted for machine tools with automatic tool changing. Since the coolant supply is automatically coupled to the tool holder when it is inserted in the tool support ram, the machine operator is relieved of the responsibility of manually adjusting the coolant supply to the cutting area and is not exposed to chips, moving machine parts, or to cutting fluids which may be toxic. Moreover, since the internal fluid passageways in the ram and tool holder are coupled at a flat radial surface of the tool adapter flange, the precision mating surfaces of the ram socket and tool shank are maintained in a dry and uncontaminated condition. Furthermore, because the internal passageways may be formed by straight drilled bores, such a fluid supply system is readily and economically adaptable to most machine tools.

While the invention has been described in connection with a ram type tool support of a vertical lathe, it will be understood that it is also applicable to other types of machine tools, including those having rotatable tool spindles. In addition, although the illustrated tool adapters have been shown with tapered shank portions, the invention may be similarly utilized with tool adapters having cylindrical shanks that are engageable in complementary shaped support sockets.

I claim as my invention:

1. In a machine tool having a tool support with a socket in one end thereof for removably receiving and supporting a cutting tool adapter having a shank shaped complementary to said socket and an outwardly extending radial flange with a surface perpendicular to the longitudinal axis of said tool adapter, said socket and shank each having bearing surfaces that are mutually engageable when said tool adapter is secured in said support for a machining operation, a cutting tool coolant supply system comprising a coolant reservoir, said support being formed with a longitudinal internal passage having an inlet and an outlet, means connecting said passage inlet to said coolant reservoir, said passage outlet being located in the end of said support at a laterally offset position from said socket, said tool adapter being formed with an internal passage having an inlet on said radial flange surface at a position aligned with said support passage when said tool adapter is secured in said support, said tool adapter passage extending from said radial flange inlet to an outlet in close proximity to the cutting tool of said adapter, means for selectively supplying coolant from said coolant reservoir through said support and tool adapter passage during a machine operation, and means for directing the flow of coolant from said adapter passage outlet onto the cutting tool of said adapter.

2. In the machine tool of claim 1 including a sealing member at the end of said support passage for forming a liquid tight coupling between said passage and said tool adapter passage when said tool adapter is secured in said support socket.

3. In the machine tool of claim 2 in which said sealing member is a flexible ring secured within said support passage with a portion thereof extending beyond the end of said support for engaging the said tool adapter flange surface about said adapter passage inlet.

4. In the machine tool of claim 1 in which said tool adapter passage includes a longitudinally directed passage extending into said gripping flange from said adapter passage inlet, a radial passage extending inwardly from said longitudinal passage, a second longitudinal passage extending from said radial passage to a location near an end of said tool adapter, and a second radial passage extending from said second longitudinal passage to said adapter passage outlet.

5. In the machine tool of claim 1 in which said coolant directing means includes a rigid conduit connected at said tool adapter outlet and extending to a position in predetermined relation to said cutting tool.

6. In the machine tool of claim 1 in which said tool support is the selectively positionable ram of a lathe.

7. A cutting tool adapter for use in a machine tool having a tool support formed with a socket in one end and an internal coolant supply passage extending to an outlet in said support end at a laterally offset position from said socket comprising a shank portion shaped complementary to said tool support socket for selective bearing engagement with said socket, a tool head portion at an end opposite said shank portion, means in said head portion for securing at least one cutting tool, a radially extending flange located intermediate said shank and head portions, said flange having a surface on the shank side thereof that is perpendicular to the longitudinal axis of said adapter for positioning adjacent said tool support end when said shank is placed in said support socket, said tool adapter being formed with an internal passage having an inlet on said radial flange surface that is aligned with said support passage when said radial flange is placed adjacent said support end, said tool adapter passage extending from said radial flange inlet to an outlet in close proximity to the cutting tool of said adapter, and means for directing coolant supplied to said adapter passage from said passage outlet onto said cutting tool.

8. The tool adapter of claim 7 in which said coolant directing means includes a rigid conduit connected at said tool adapter passage outlet, said conduit extending from said outlet to a position adjacent said cutting tool.

9. The tool adapter of claim 8 in which two cutting tools are secured by said tool head, and said coolant directing means is adapted to direct coolant from said adapter passage outlet to each of said cutting tools.

10. The tool adapter of claim 9 in which said coolant directing means includes a T-shaped fitting threadably engaging said tool adapter outlet, and rigid conduits connected at each end of said T-shaped fitting for directing fluid from said fitting to a respective one of said cutting tools.

11. The tool adapter of claim 7 in which said coolant supply passage includes a longitudinally directed passage extending into said gripping flange from said passage inlet, a radial passage extending inwardly from said longitudinal passage, and a second longitudinal passage extending from said radial passage through said tool head.

12. The tool adapter of claim 11 including a second radial passage communicating between said second longitudinal passage and said adapter outlet.

13. The tool adapter of claim 7 in which said shank portion has a tapered shape.

* * * * *